(No Model.)
F. V. YEAGER.
REED PLANE.
No. 258,971. Patented June 6, 1882.
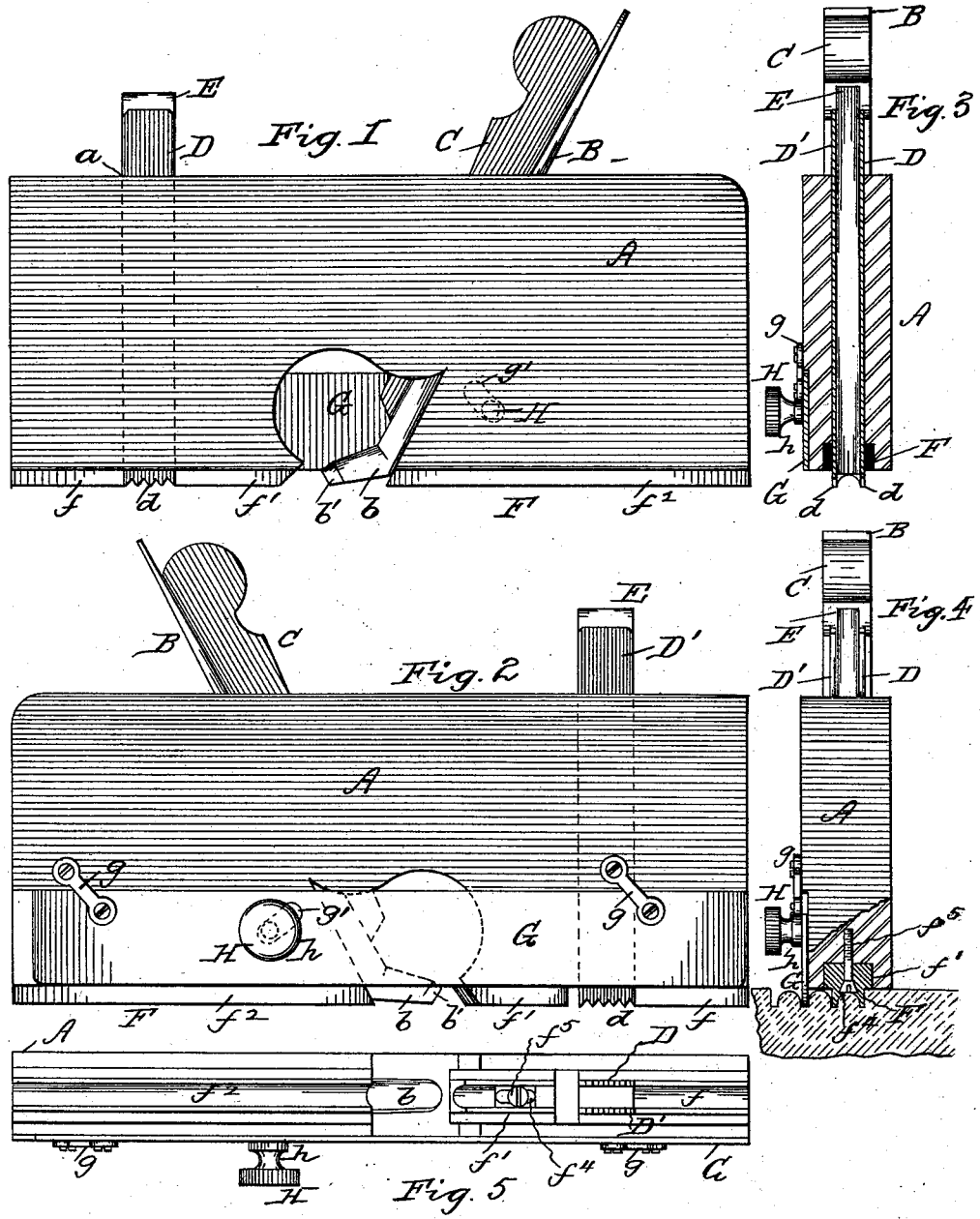
WITNESSES:
Chas. W. Hopple
George H. Vandegrift
INVENTOR
Fredk. V. Yeager

UNITED STATES PATENT OFFICE.

FREDERICK V. YEAGER, OF PHILADELPHIA, PENNSYLVANIA.

REED-PLANE.

SPECIFICATION forming part of Letters Patent No. 258,971, dated June 6, 1882.

Application filed August 26, 1881. (No model.)

*To all whom it may concern:*

Be it known that I, FREDERICK V. YEAGER, a citizen of the United States, and a resident of the city and county of Philadelphia, in the State of Pennsylvania, have invented certain new and useful Improvements in Reed-Planes, of which the following is a specification, reference being had to the accompanying drawings, wherein—

Figure 1 is a side elevation of my improved reed-plane. Fig. 2 is an elevation of the reverse side of the same. Figs. 3 and 4 are tranverse vertical sections, and Fig. 5 is an inverted plan of the same.

My invention has for its object to provide a plane for working reeds across the grain of wood. Heretofore such result has been obtained by means of a saw and chisel, and to produce a cluster of reeds by such means required great care and consumed much time and labor, thereby making the operation one of extreme tediousness and expense. With my improved plane, however, reeds can be worked across the grain of wood with ease and rapidity.

My invention consists in the novel construction and arrangement of the plane, as hereinafter more fully described.

Referring to the accompanying drawings, A represents the stock of the plane, B the bit thereof, and C the wedge for securing said bit in an opening in said stock. The bit B is formed with a projecting convex cutter, $b$, being outside ground, as shown at $b'$.

D D' are cutters, passing through an opening, $a$, in the forward part of the plane, and are held therein by means of a wedge, E. Said cutters are placed a distance apart equal to the width of the reeds designed to be worked, and have their lower or cutting edges serrated, as shown at $d$.

F represents the sole of the plane, made in three sections, $f\, f'\, f^2$. The sections $f\, f^2$ are stationary. The section $f'$ is formed with a slot, $f^4$, through which passes a screw, $f^5$, into the stock A, as plainly shown in Fig. 4. By loosening said screw the section $f'$ may be adjusted to and from the cutting-edge of the bit B to regulate the thickness of the chip or shaving designed to be cut, so as to insure smoothness of working.

G is a gage, secured to stock A by pivoted links $g\, g$; and H is a thumb-screw passing through a curved or other suitable slot, $g'$, in the gage, and screws into the stock A, the effect whereof is that when said gage is raised or lowered, and the thumb-screw H turned, its head $h$ will impinge against said gage, and will thereby retain the latter in its adjusted positions.

The operation is obvious, and as follows: In forming the first reed of a cluster the gage G is raised, as shown in Figs. 2 and 3, and the plane is moved to and fro across the grain of the wood. During each such forward movement the cutters D D' scribe or cut two parallel lines in advance of the bit B, so that the cutting-edge of the latter merely removes the chip or shaving between the lines so formed by the cutters D D'. Consequently a smooth or unbroken reed can be formed across the grain of wood by such plane. After the first reed is worked the gage G is lowered by first loosening the thumb-screw H, which allows the gage to fall, whereupon it is held in such position by turning said screw until its head binds against the gage. The latter is then placed in the outside crevice of said first-formed reed, so that the latter forms a guide to assist in the working of the second reed. By such means each succeeding reed is formed parallel to its immediate predecessor, such operation being plainly illustrated in Fig. 4.

What I claim as my invention is—

1. In a plane for working reeds across the grain of wood, the combination of advance cutters D D', having serrated cutting-edges $d$, plane-bit B, having convex cutter $b$, outside ground or bevel, $b'$, sole F, having adjustable section $f'$, and gage G, secured to the body of the plane by links $g\, g$, and provided with a thumb-screw, H, substantially as shown and described.

2. In a plane for working reeds across the grain of wood, the combination of main bit B, having convex cutter $b$, outside ground or bevel, $b'$, advance cutters D D', provided with serrated cutting-edges $d\, d$, and adjustable sole-section $f'$, substantially as shown and described.

In testimony that I claim the foregoing I have hereunto set my hand this 23d day of August, 1881.

FREDK. V. YEAGER.

Witnesses:
CHAS. W. HOPPLE,
GEORGE H. VANDEGRIFT.